United States Patent [19]

Stuart

[11] Patent Number: 5,678,845
[45] Date of Patent: Oct. 21, 1997

[54] STABILIZER FOR A STEER AXLE AIR RIDE SUSPENSION OF A VEHICLE

[75] Inventor: John W. Stuart, Springfield, Mo.

[73] Assignee: Reyco Industries, Inc., Springfield, Mo.

[21] Appl. No.: 593,093

[22] Filed: Jan. 29, 1996

[51] Int. Cl.[6] ............................................. B60G 21/055
[52] U.S. Cl. .......................... 280/689; 280/712; 267/188
[58] Field of Search ................................. 280/689, 712,
280/713, 711, 688, 718, 720, 725; 267/188,
189, 241, 256, 273, 276

[56] References Cited

U.S. PATENT DOCUMENTS

| | | | |
|---|---|---|---|
| 2,179,016 | 11/1939 | Leighton | 280/725 |
| 2,753,007 | 7/1956 | Read | 280/689 |
| 2,754,111 | 7/1956 | Norrie | 280/718 |

FOREIGN PATENT DOCUMENTS

| | | | |
|---|---|---|---|
| 2529838 | 1/1984 | France | 280/712 |
| 23 37 935 | 2/1975 | Germany | 280/712 |

Primary Examiner—Brian L. Johnson
Assistant Examiner—Peter C. English
Attorney, Agent, or Firm—Dorn, McEachran, Jambor & Keating

[57] ABSTRACT

A stabilizer for a steer axle air ride suspension of a vehicle. The vehicle includes a frame having longitudinally extending beams, a pair of spring beams each pivotally attached at its forward end to one of the frame beams by a pivot pin and an air spring interposed between each of the frame and spring beams. The pivot pins lie on a common axis. The stabilizer includes a somewhat U-shaped torsion bar having side portions connected by a cross portion. The distal ends of the side portions of the U-shaped torsion bar are pivotally attached to the pivot pins and the cross portion is rotatably connected to the axle. Isolators are installed at the pivotal attachments of the distal ends of the side portions of the U-shaped bar to the pivot pins and at the rotatable connections of the cross portion to the axle.

7 Claims, 2 Drawing Sheets

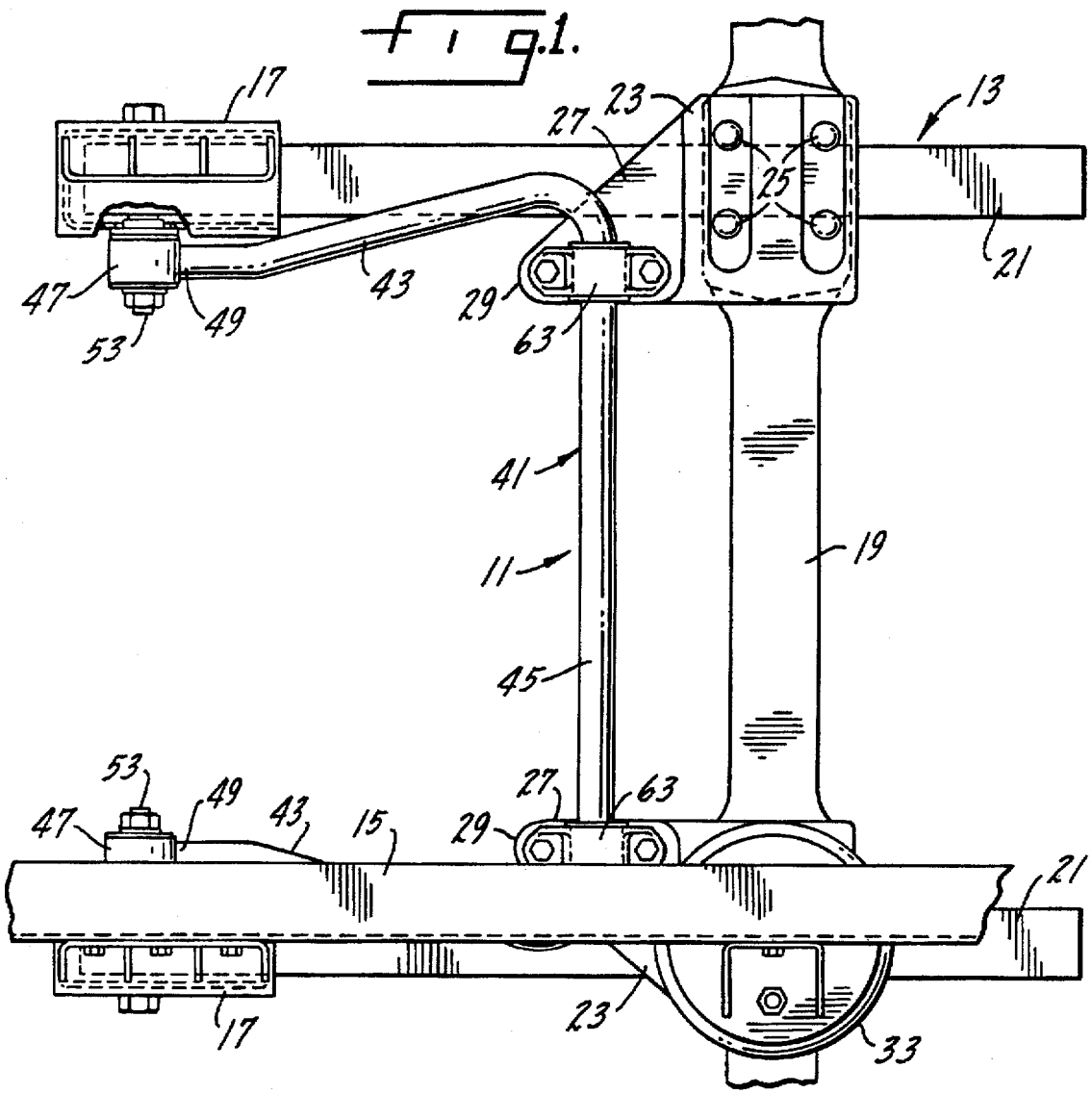
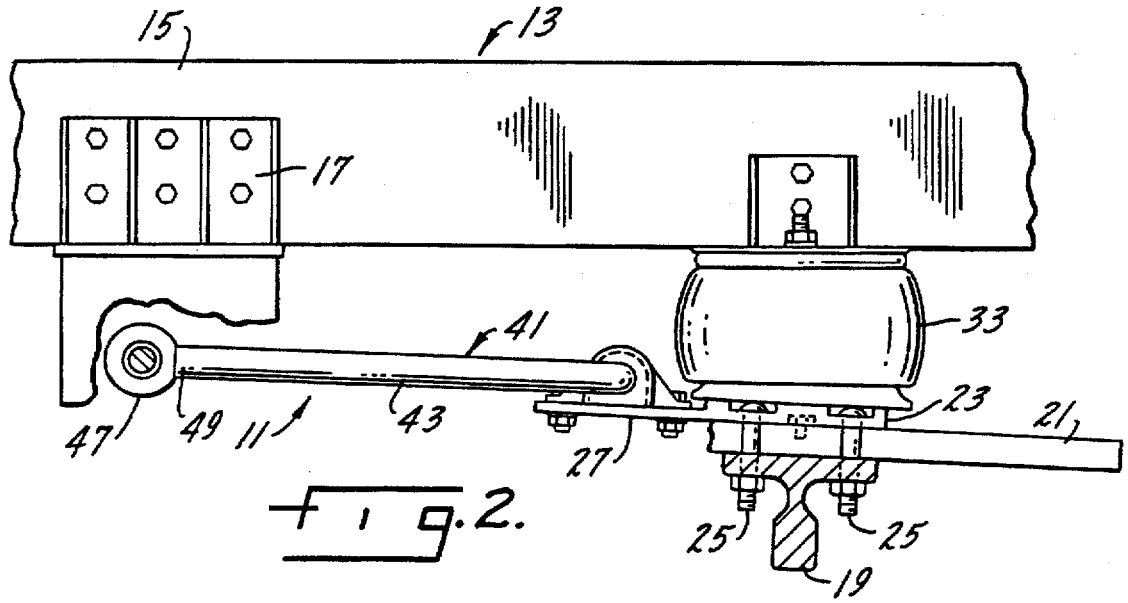

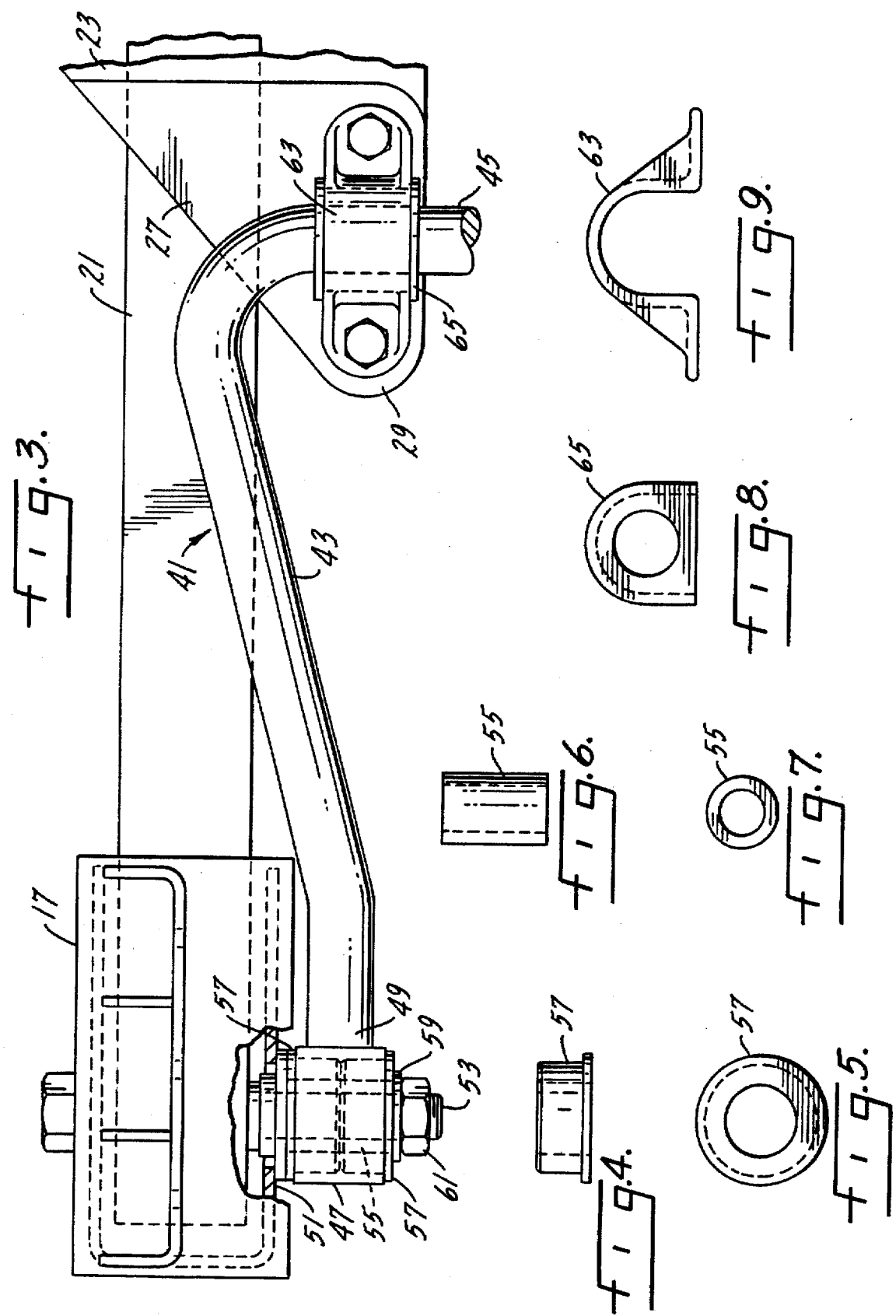

STABILIZER FOR A STEER AXLE AIR RIDE SUSPENSION OF A VEHICLE

BACKGROUND AND SUMMARY OF THE INVENTION

This invention is directed to a stabilizer for a steer axle air ride suspension of a vehicle.

Suspension systems are generally tuned to the lowest possible vertical rate in order to provide a soft ride for the cargo and driver of the vehicle. The vertical rate of the entire vehicle suspension, which is sometimes referred to as the spring rate, is dictated by the spring rates of the individual suspension spring members as well as by any component of the suspension system which affects the ability of the vehicle wheels to move freely with respect to the vehicle body.

It is desirable that a vehicle suspension system have the highest roll rate possible to provide good vehicle stability and handling. Because a vehicle's roll rate is directly proportional to its vertical or spring rate, improvements to the suspension system which reduce the vertical rate also affect the roll rate adversely. This problem becomes especially acute in vehicles with high centers of gravity such as motor homes and buses.

A stabilizer bar should increase the vehicle stability (and thus improve handling) only in a body roll condition. A body roll condition exists when the body and frame lean or tilt laterally with respect to the ground and wheels. This typically occurs while a vehicle is cornering, for example, on a highway off ramp. The stabilizer bar will increase the vehicle stability by increasing the vertical suspension rate when one wheel moves with respect to the vehicle body or when one wheel moves toward the body while the other wheel moves away; in other words, during the body roll. Ideally, the addition of a stabilizer bar will not increase the suspensions vertical rate and thus will not deteriorate the vehicle ride quality when both wheels move simultaneously with respect to the body. In actual practice, however, most designs will increase the vertical rate in all wheel travel modes by virtue of the geometry of the stabilizer system and the types of stabilizer bar end connections which are used.

Most stabilizer bar designs use bayonet type end links or shackle end links. In contrast, the design of this invention has eye end connections centered directly in line with the suspension pivot pins. Due to this arrangement, the stabilizer bar will pivot about the same axis as the suspension system and will not bind as the wheels travel with respect to the body and, thus, will not increase the suspension vertical rate.

The bayonet-type end links and shackle end links used as end connectors on conventional stabilizer bars both employ rubber and polyurethane isolators. The links and isolators must deflect before the stabilizer bar can add roll stability to the vehicle suspension. Therefore, these links and their isolators create a lag in the effectiveness of the stabilizer bar, and cause a non-constant or incremental roll stabilization. Further, bayonet-type and shackle end links are orientation sensitive. If they are not oriented properly, the isolator life will be significantly reduced and the roll stability of the system will be further non-consistent across its range of motion.

Steer axle suspensions generally have a redundant means for supporting longitudinal loads and maintaining longitudinal axle position as a safety measure in the event the main spring beam fails. This redundant means usually includes a secondary spring leaf which at its forward end wraps around the main spring beam eye/pivot. Since the stabilizer bar of this invention does not have linkages and its pivot is on the same axis as the suspension pivot, it acts as the redundant means. The elimination of secondary leaf springs results in a significant weight and cost reduction.

Therefore, a principal object of this invention is a stabilizer system for a steer axle air ride suspension of a vehicle which provides roll stability without increasing the vertical rate of the suspension system when both wheels of an axle move simultaneously with respect to the vehicle frame.

Another object of this invention is a stabilizer bar system which pivots about the same axis as the suspension spring beam eyes.

Another object is a stabilizer system which provides longitudinal axle support should the suspension spring beams fail.

Another object is a stabilizer bar system which does not have a lag in its effectiveness and will therefore add roll stability as soon as the vehicle body and chassis begin to lean or tilt.

Another object is a stabilizer system which allows changes in axle alignment without affecting the stabilizer system geometry.

Still another object of this invention is a stabilizer bar which provides roll stability at a constant rate throughout its range of motion.

Yet another object of this invention is a stabilizer system which can be retrofitted to an existing suspension or can be applied to a suspension as original manufacturer's equipment.

Other objects may be found in the following specification, claims and drawings.

BRIEF DESCRIPTION OF THE DRAWINGS

The invention is illustrated more or less diagrammatically in the following drawings wherein:

FIG. 1 is a top plan view of a part of a vehicle chassis with some portions removed, others broken away and others shown in hidden lines for clarity of illustration;

FIG. 2 is a side elevational view of the chassis of FIG. 1 with some portions broken away and others shown in hidden lines for clarity of illustration;

FIG. 3 is an enlarged partial view of a portion of the suspension shown in FIGS. 1 and 2 with some parts broken away and others shown in hidden lines for clarity of illustration;

FIG. 4 is a top plan view of a bushing of the suspension of FIG. 3;

FIG. 5 is an end elevational view of the bushing of FIG. 4;

FIG. 6 is a plan view of a sleeve of the suspension of FIG. 3;

FIG. 7 is an end elevational view of the sleeve of FIG. 6;

FIG. 8 is an end elevational view of a stabilizing bar cross-piece bushing; and

FIG. 9 is an end elevational view of a stabilizer bar cross-piece bushing bracket.

DESCRIPTION OF THE PREFERRED EMBODIMENT

FIGS. 1–9 of the drawings show the stabilizer bar system 11 of this invention installed on a vehicle chassis 13 of a steer axle air ride suspension. The vehicle chassis includes longitudinally extending side beams 15, only one of which is shown. The side beam shown is on the left-hand side of the vehicle when viewed facing forwardly. The side beams are conventionally channel-shaped in cross section with the open sides of the channels facing each other. Hanger brackets 17 are attached to the side beams 15 in transversely aligned locations which are located forwardly of the axle 19 in the normal path of travel of the vehicle.

A rearwardly extending spring beam 21 located on each side of the chassis 13 is clamped between the axle 19 and an air spring support plate 23 by bolts 25. Each air spring support plate 23 has a triangular portion 27 with the apex 29 thereof extending forwardly towards a hanger bracket 17. An air spring 33 is fastened at both top and bottom to each air spring support plate 23 and to a side beam 15 of the chassis 13.

A somewhat U-shaped stabilizer torsion bar 41 connects between the hanger brackets 17 and the triangular shaped portions 27 of the air spring support plates 23. The stabilizer torsion bar includes tubular side arms 43 which are formed integrally with a tubular cross arm 45. An eye 47 is formed at the distal end 49 of each side arm 43. The side arms 43 are bent inwardly relative to the cross arm 45 to locate their distal ends inside the hanger brackets 17. This arrangement provides a torsion bar with greater roll stability. Each eye 47 is positioned against the inside wall 51 of its hanger bracket and fits over a pivot bolt 53 which is mounted on and extends through its hanger bracket 17. Each pivot bolt is surrounded by a sleeve 55 where it passes through the eye. Bushings 57 on opposite ends of each eye fit over the sleeve. In one mode of assembly, the sleeve 55 is bonded to the bushings 57 by an adhesive and the bushings are press fitted into an eye 47. In this mode of assembly, the shoulders on the bushings are omitted. The bushings and sleeve are held in position in the eye 47 by a washer 59 and a nut 61 which threads onto the pivot bolt 53.

The cross arm 45 of the stabilizer bar 41 is rotatably held to each of the triangular shaped portions 27 of the air spring support plates 23 by a bushing bracket 63 which receives and holds a D-shaped bushing 65 through which the cross arm extends. The sleeves 55 and bushings 57 and 65 may be formed of a hard rubber or a urethane of a suitable durometer hardness. These sleeves and bushings also function as isolators in the stabilizer system of this invention. Durometer hardnesses in the ranges of 70 for rubber and 90 for urethane, both measured according to the Shore A system, have been found to be acceptable because roll stability is obtained more rapidly even for slight body rolls. However, it should be appreciated that the durometers of the isolators may be tuned to the desired vertical rate of the vehicle suspension.

The pivot bolts 53 also receive and support the eyes of the spring beams 21 which are positioned inside the hanger brackets 17, thus providing for rotation of the spring beams 21 and stabilizer bar 41 about a common axis defined by the pivot bolts 53. The stabilizer bar 41, therefore, also functions as a replacement for the secondary leaf spring which is commonly used in steer axle air ride suspensions to maintain axle position in case of spring beam 21 failure. Thus, the stabilizer bar also provides the safety feature formerly supplied by the secondary leaf spring.

When the vehicle wheels and axle 19 move together relative to the chassis 13, the stabilizer bar 41 rotates about its pivotal connections to the pivot bolts 53 without increasing the vertical rate of the suspension. When one vehicle wheel moves relative to the chassis and not in unison with the other wheel mounted on the axle 19, the stabilizer bar 41 functions as a transverse torsion bar to stabilize the vehicle by restricting body roll. In such situations, the cross arm 45 of the stabilizer bar 41 twists relative to one or both of the side arms 43. The stabilizer bar 41 of this invention will not lag appreciably in its stabilizing action because it lacks the linkages usually found in stabilizer systems and has many fewer isolators than are usually found in such systems. Further, because the isolators of the stabilizer of this invention are in the form of sleeves 55 and bushings such as bushings 57 and 65 which engage pivotally mounted members, they do not have to deflect when the stabilizer bar rotates and thus do not cause a lag in the effectiveness of the stabilizer bar. Accordingly, they may be made of hard rubber or plastic such as urethane without adding to the suspension's vertical rate.

The stabilizer bar 41 of this invention can be mounted on suspension configurations of various vehicles and can be retrofitted to existing suspension systems with minimum effort. Mounting of the stabilizer bar is facilitated by the ability to rotatably mount the ends of the stabilizer side arms on the pivot pins that support the spring beam eyes while the attachment of the cross arm of the stabilizer to the axle is facilitated by the use of D-shaped bushings 65 which are fastened to the axle 19 by bushing brackets 63.

I claim:

1. A steer axle air ride suspension for a vehicle having an axle, a frame including longitudinally extending beams, a pair of spring beams each having a forward end, each spring beam being pivotally attached at its forward end to one of said frame beams by a respective pivot pin, said pivot pins being located on a common axis, an air spring interposed between each of said spring beams and said frame beams at locations rearwardly of said pivot pins, and a stabilizer, said stabilizer including an approximately U-shaped torsion bar having side portions connected by a cross portion, said side portions each having a distal end, said distal ends of said side portions of said stabilizer torsion bar being pivotally attached to said pivot pins on said common axis as said spring beam pivotal attachments and said cross portion of said torsion bar being connected to said axle.

2. The suspension of claim 1 in which said pivot pins are bolts mounted on hangers depending from said frame beams.

3. The suspension of claim 1 in which said cross portion of said torsion bar is rotatably connected to said axle.

4. The suspension of claim 3 in which isolators are installed at the pivot attachments of said side portions to said pivot pins and the rotatable connection of said cross portion to said axle.

5. The suspension of claim 4 in which said isolators are formed as sleeves and bushings.

6. The suspension of claim 5 in which said isolators are formed of hard rubber.

7. The suspension of claim 5 in which said isolators are formed of urethane.

* * * * *